(12) United States Patent
Colwell et al.

(10) Patent No.: US 9,749,888 B1
(45) Date of Patent: Aug. 29, 2017

(54) SYSTEM FOR NETWORK CHARACTERISTIC ASSESSMENT

(71) Applicant: HEADSPIN, INC., Mountain View, CA (US)

(72) Inventors: Brien Colwell, Oakland, CA (US); Manish Lachwani, Los Altos, CA (US)

(73) Assignee: Headspin, Inc., Mountain View, CA (US)

( * ) Notice: Subject to any disclaimer, the term of this patent is extended or adjusted under 35 U.S.C. 154(b) by 0 days.

(21) Appl. No.: 14/976,480

(22) Filed: Dec. 21, 2015

(51) Int. Cl.
*H04W 24/08* (2009.01)
*H04W 24/10* (2009.01)
*H04L 12/26* (2006.01)

(52) U.S. Cl.
CPC ......... *H04W 24/08* (2013.01); *H04L 43/0882* (2013.01); *H04L 43/0888* (2013.01); *H04W 24/10* (2013.01)

(58) Field of Classification Search
CPC .. H04W 24/08; H04W 24/10; H04L 43/0888; H04L 43/0882; H04L 24/10
USPC ........ 715/736; 370/235, 230, 232, 252, 231; 455/452.2
See application file for complete search history.

(56) References Cited

U.S. PATENT DOCUMENTS

| | | | | |
|---|---|---|---|---|
| 8,175,538 B1* | 5/2012 | Chen | ..................... | H04B 7/0413 455/424 |
| 8,621,091 B1* | 12/2013 | Akalin | .............. | G06F 17/30902 709/220 |
| 9,356,883 B1* | 5/2016 | Borthakur | ........... | H04L 41/5025 |
| 2007/0055476 A1* | 3/2007 | Whisnant | ........... | G05B 23/0221 702/179 |
| 2011/0090939 A1* | 4/2011 | Diener | .................. | H04L 1/0001 375/136 |
| 2011/0151864 A1 | 6/2011 | Byun et al. | | |
| 2014/0113625 A1 | 4/2014 | Gruber et al. | | |
| 2015/0319048 A1* | 11/2015 | Griff | ....................... | H04L 41/12 715/736 |
| 2016/0133231 A1* | 5/2016 | Liu | .......................... | G09G 5/14 345/205 |

(Continued)

OTHER PUBLICATIONS

Doan, Phuoc Huu, "Non Final Office Action dated Jun. 2, 2016", U.S. Appl. No. 14/850,798, The United States Patent and Trademark Office, Jun. 2, 2016.

(Continued)

*Primary Examiner* — Inder Mehra
(74) *Attorney, Agent, or Firm* — Lindauer Law, PLLC

(57) ABSTRACT

Mobile devices executing applications utilize data services worldwide. Many failures or adverse user experiences of these applications may result from network issues. Data may be acquired at a mobile computing device during communication. Over relatively short time scales differences in the data may be determined. Based on the differences, output data may be generated that is indicative of one or more particular network characteristics, such as bandwidth, latency, transmit power, received signal strength, and so forth. The output data may then be used to modify operation of a device, troubleshoot operation, and so forth. The output data may be transmitted opportunistically at particular times and under certain conditions to minimize operating time of a radio of the mobile computing device and reduce contention with transfer of other data using the radio.

20 Claims, 11 Drawing Sheets

(56) References Cited

U.S. PATENT DOCUMENTS

2016/0205720 A1* 7/2016 Mandanapu ........ H04L 41/5006
    370/328
2016/0254967 A1* 9/2016 Brown .................. H04L 43/024
2016/0267930 A1* 9/2016 Chu ....................... G11B 5/012

OTHER PUBLICATIONS

Doan, Phuoc Huu, "Final Office Action dated Nov. 4, 2016", U.S. Appl. No. 14/850,798, The United States Patent and Trademark Office, Nov. 4, 2016.

Doan, Phuoc Huu, "Notice of Allowance dated Feb. 14, 2017", U.S. Appl. No. 14/850,798, The United States Patent and Trademark Office, Feb. 14, 2017.

* cited by examiner

SYSTEM FOR NETWORK CHARACTERISTIC ASSESSMENT

BACKGROUND

Mobile devices executing applications that utilize networks during operation to transfer data may experience failures or otherwise produce adverse user experiences as a result of network conditions. Gathering information at the mobile device about characteristics of the network may be useful to prevent or mitigate the impacts of failures.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
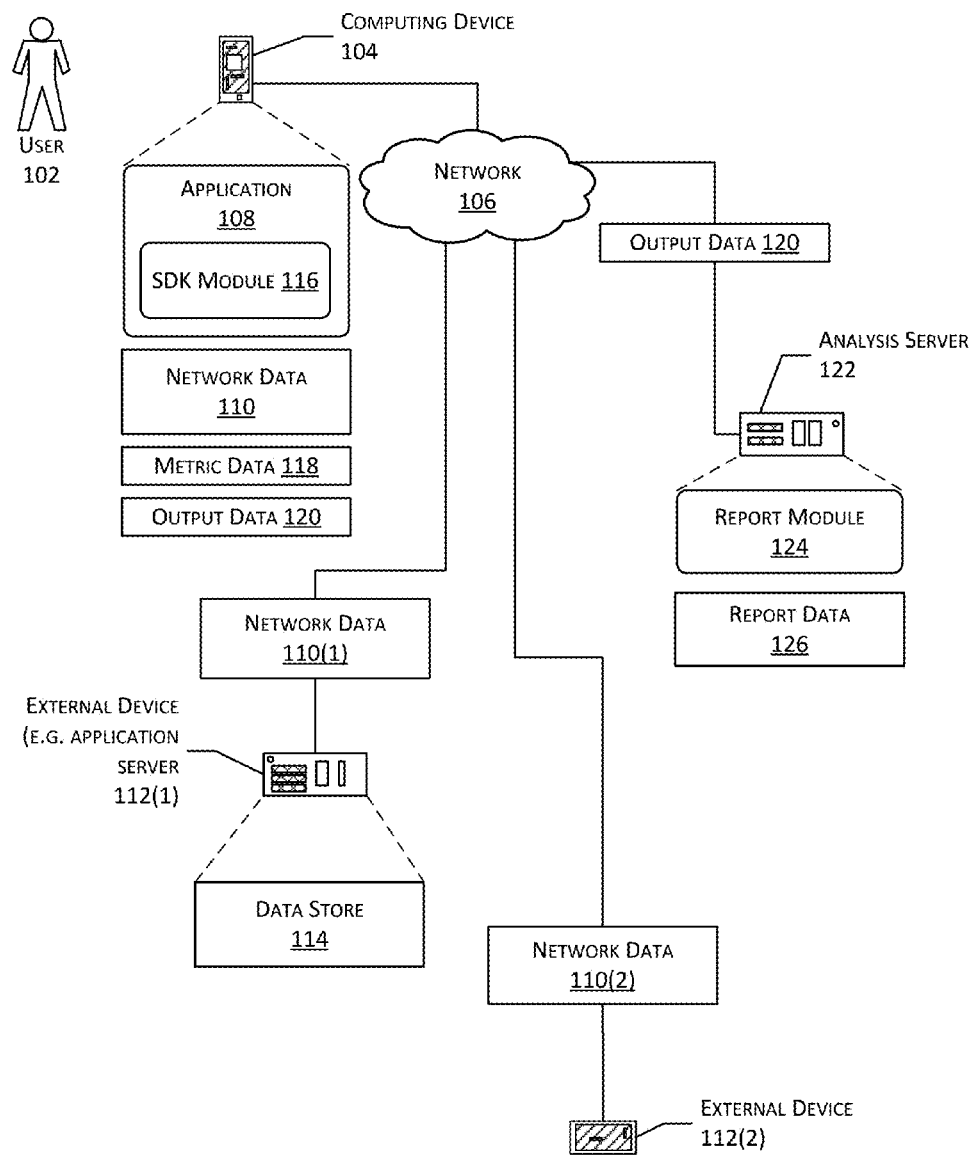
FIG. 1 depicts a system for network characteristic assessment, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Computing devices may execute an application to provide various functions. These computing devices may include, but are not limited to, smartphones, laptops, tablet computers, embedded devices, wearable computing devices, appliances, automobiles, aircraft, and so forth. Functions provided by the application may involve retrieval of data, presentation of that data to a user, processing of data, and so forth.

Some applications may communicate with one or more external devices, such as a server, using a network. For example, a navigation application may use the network to send location information to an application server that is indicative of a position of a mobile device and receive map data to present on a display of the mobile device. Problems with this communication may result in the application failing to perform the desired function, error messages, improper operation, and so forth. Continuing the example above, a long latency or delay in receiving the map data may cause the application on the mobile device to present an error to the user. These problems may result in an adverse user experience. For example, the user may discontinue using the application because of these problems and instead use another application.

Some problems that the application may encounter while using the network may not be immediately perceived by the user. For example, the application may drain the battery of the mobile device by more quickly by resending data due to communication problems with the network.

The network used by the computing device to access the external device may include a wireless wide area network (WWAN), such as a wireless cellular data network (WCDN). For example, the mobile device may comprise a smartphone that accesses a WCDN provided by a telecommunication company. By using the WCDN, the smartphone is able to send and receive data to other devices, such as those accessible on the Internet.

Performance of the network used by the computing device executing the application may be variable due to many factors. These factors may include the geographic location (geolocation) of where the computing device is located while communicating with the network, the network access point in use, congestion at the network access point, congestion at the interconnect that connects the WCDN to another network such as the Internet, capability of the network access point, and so forth. For example, during a morning commute, many users may be streaming video content to their mobile devices, resulting in overall network congestion. In another example, the telecommunication company may have some network access points that support 3G data transmission and are relatively more congested while other network access points are able to support 4G data transmission and are relatively less congested.

Network characteristics may include information associated with the transfer of data using the network. The network characteristics may include, but are not limited to, bandwidth, latency, number of packets sent, packet loss, transmit power, received signal strength, jitter, and so forth. The network characteristics for a particular connection between a network access point and a communication interface of a computing device may be available locally, but may be difficult or impossible to provide to a developer or other entity associated with maintaining the application or the computing device. The communication interface includes a radio to send and receive wireless signals. But, in many situations, information about operation of the radio may be unavailable to other portions of the computing device or other attached equipment. For example, equipment at the cell site may have information about packet loss for a particular connection, but that data may only be accessible by a technician who is physical connected to that radio. In another example, the radio in the communication interface may be secured such that only very limited information about the connection is sent to other components of the computing device. As a result, the operating system and the application of the computing device may have little or no information about operation of the radio attached to the computing device.

The network characteristics, or information based on the network characteristics, may be very useful to a user of the computing device, developers of the application, or other entities. For example, detailed network characteristics may provide a developer with insight that particular areas in a particular city have poor cellular data coverage. Using this information, the developer may take measures to improve the user experience, such as modifying operation of the application, working with the telecommunication company to improve coverage, and so forth.

Described in this application are techniques for generating output data that provides information about a computing device. For example, the output data may be indicative of one or more network characteristics associated with the transfer of data between a network and a mobile device. In one implementation, the techniques may be implemented using a software development kit (SDK) that may be incorporated into or otherwise associated with an application. For example, the SDK may be compiled into an application by a developer.

During operation, the application may send network data to external devices using the network. For example, the network data may include requests for data, responses to those requests, commands, status information, and so forth. The network data may include data that is transferred during the normal course of operation and is not solely for the purpose of diagnostic testing.

The SDK may include a SDK module to generate metric data. The metric data comprises information indicative of operation of the computing device. In some implementations, the metric data may be indicative of one or more network characteristics. The metric data may be generated in a passive fashion, that is without explicitly triggering the send or receive of data. For example, the SDK may generate metric data responsive to the transfer of the network data, rather than initiating a transfer of data. In this respect, the operation of the SDK module may be considered passive in that it may operate to generate metric data without influencing the flow of network data or sending special data.

The SDK module may include or access one or more counters, each counter associated with a different network characteristic. For example, a counter may measure a number of packets sent per unit of time. The counter may acquire data at one or more of an application level, operating system level, or hardware level of the communication interface.

A rate of data collection of the metric data may be adjusted over time. At a first time, a first data collection rate may be used, while at a second time, a second data collection rate greater than the first data collection rate may be used. For example, the first data collection rate may be to sample a counter 10 times per second and store those samples or information based on the samples as the metric data. The values of the metric data may be processed to generate output data. For example, first metric data up to a first time may be binned and first histogram data generated. First percentile values may be determined from the first histogram data. Values of second metric data may be acquired later, may be binned, second histogram data generated, and then second percentile values determined. Comparison data indicative of a difference between the first percentile values and the second percentile values may be determined. If the difference of the comparison data exceeds a threshold value, output data indicative of an event may be stored.

In some implementations, upon detection of an event, the data collection rate may be changed. For example, output data indicative of an increase in transmission of network data may result in a transition to the second data collection rate. For example, the second data collection rate may be to sample the counter 1000 times per second. Output data may then be generated from the resulting data, now with much higher temporal resolution due to the increased data collection rate.

The shorter times afforded by the increased data collection rate allow for the collection of metric data and subsequent generation of output data that may be more indicative of limitations associated with operation of the communication interface. Many data transmissions are "bursty". For example, many packets may be queued up for transmission in a short time period, followed by a lull in transmission. As a result, during a short time interval, the communication interface may be in a saturated condition, such as sending data as quickly as possible in an attempt to clear the queue. These momentary "bursts" may be recorded by the metric data.

The output data may include information such as changes in percentile values for a particular network characteristic that exceeds a threshold value, a value based on the metric value such as a maximum, and so forth. The output data may be generated from the metric data using a variety of techniques. For example, the technique of binning, generating histogram data, creating comparison data, and so forth, as described above may be used. In other implementations, other techniques such linear analysis, regression analysis, curve fitting, and so forth, may be utilized. The output data may also include other information, such as a geolocation of the computing device at the time the metric data was acquired, application state data, and so forth. For example, the application state data may indicate an address of the external device, one or more environment variables of the application, and so forth.

Once acquired, the output data may then be provided to an analysis server or other external device for subsequent use. For example, the developer of the application, developer of the computing device, the telecommunication carrier, or other entity may use the output data to assess operation of the network. The analysis server may generate report data from the output data. For example, the report data may indicate cellular access points in a particular geographic area that computing devices connecting thereto experience latencies exceeding a threshold.

Transmission of the output data may be scheduled opportunistically. Such scheduling may reduce impact on operation of the computing device by minimizing contention during communication between the output data and the network data, minimizing power consumption by reducing duration of full-power operation of a radio in the communication interface, and so forth.

Based at least in part on the output data, the SDK module may determine that an opportunistic transfer window is available for transmission of the output data. This determination may be based at least in part on a change in one or more of the network characteristics as expressed in the output data. For example, based on a trend of decreasing number of packets sent per unit of time, the SDK module may transition from the faster second data collection rate back to the slower first data collection rate. The SDK module, determining that the communication interface may now be underutilized, adds at least a portion of the output data to a transmission queue. In some implementations, the SDK module may limit the quantity of the output data per unit time. For example, the SDK may be configured to send only a single packet of output data no more frequently than every 5 minutes.

The SDK module may be configured to time the placement of the output data into the queue to minimize or prevent the communication interface from remaining in a particular mode, such as keeping the radio at full power. For example, the SDK module may designate the beginning of an opportunistic transfer window as occurring when network data is still being transferred, and thus the radio is still on, but the rate at which network data is being transferred has decreased at a rate greater than a threshold amount during a specified time period. In this way, the system avoids bringing the radio from a standby state to a full power state to send the output data.

The quantity of output data to be sent may exceed the capacity of the opportunistic transfer window in some circumstances. The output data may be further processed to facilitate transmission. For example, older output data may be discarded in favor of transmitting newer output data, a subset of output data may be sent, a digest of the output data may be created and sent, and so forth.

By using the techniques described herein, information about network characteristics or other aspects of operation of the computing device may be acquired and provided for analysis in a fashion which minimizes consumption of the computing devices resources such as processor, memory, network access, and so forth. As a result, output data may be more readily obtained from many computing devices. This output data may then be used to discover problems associated with access to the network, improve user experience, reduce power consumption, and so forth.

FIG. 1 depicts a system 100 for network characteristic assessment, according to one implementation. A user 102 may use a computing device 104. In some implementations, the computing device 104 may operate free from intervention of a user 102, such as an unattended camera, a sensor platform, an access point, a drone, and so forth.

The computing device 104 may be connected to a network 106. The network 106 may comprise a local area network (LAN), a wireless LAN (WLAN), a wireless wide area network (WWAN) such as a wireless cellular data network (WCDN), and so forth. In some implementations, the network 106 may comprise a personal area network (PAN), universal serial bus (USB) connection, and so forth. The computing device 104 may be wired or wirelessly connected to the network 106. The computing device 104 may have a communication interface configured to connect to the network 106. For example, the communication interface may include a radio to wirelessly communicate with a WCDN.

An application 108 may be executed at least in part on the computing device 104. In some implementations, the application 108 may send to or receive network data 110 from one or more external devices 112 using the network 106. The external device 112 may store or retrieve information from a data store 114, such as a database or file system. For example, the application 108 may comprise a web browser application 108 that retrieves web pages from a web server by way of a WCDN. The network data 110 may comprise HTTP requests sent from the web browser application 108 to the web server and web page data sent to the web browser from the web server. The network data 110 may comprise data transferred to or from the computing device 104 during normal operation. In some implementations, the network data 110 may omit data used to test the communication interface, such as test data files, data including predetermined test patterns of data, and so forth. The external device 112 may comprise a server, another computing device 104, and so forth.

The application 108 may incorporate, be linked to, or be configured to access a software development kit (SDK) module 116. For example, at compile time, the SDK 116 may be included into the compiled application 108. In other implementations, techniques other than an SDK module 116 may be used to provide the functionality described herein. For example, lines of computer code that provide the functionality of at least a portion of the SDK module 116 may be incorporated into the code base of the application 108.

The SDK module 116 may be configured to generate, acquire, or otherwise access metric data 118. The metric data 118 comprises information indicative of operation of the computing device 104. In some implementations, the metric data 118 may be indicative of one or more network characteristics. The network characteristics may include, but are not limited to, bandwidth, latency, number of packets sent, packet loss, transmit power, received signal strength, jitter, and so forth. In some implementations, the metric data 118 may comprise values produced by a counter. For example, a counter may be used to determine a count of packets sent per unit time. The value of the counter after a particular interval of time may be stored as the metric data 118.

The SDK module 116 may process the metric data 118 to generate output data 120. In some implementations, the metric data 118 may be binned. During binning, values are associated with a particular bin or interval of values. Histogram data may then be generated from the binned information. The histogram data may indicate a particular interval and a frequency or count of the number of values of metric data 118 that are within that particular interval. The histogram data may be further processed by the SDK module 116 to generate other information, such as percentile values, determine minimum value, maximum value, average value, mode, and so forth.

The SDK module 116 may generate comparison data by assessing changes in the metric data 118 from one time to another. For example, a change in percentile data from one time to another may be calculated. If the change exceeds a threshold value, the output data 120 may be generated indicative of an occurrence of an event. For example, where the network characteristic is indicative of network latency, an increase in the $95^{th}$ percentile value from time=1 to time=2 that exceeds a threshold value of 200 milliseconds (ms) may result in output data 120 indicative of this event. The output data 120 may comprise data indicative of one or more events.

The computing device 104 may send at least a portion of the output data 120 to an analysis server 122. For example, an application developer may configure the SDK module 116 to send the output data 120 to the analysis server 122. The analysis server 122 may execute at least a portion of a report module 124. The report module 124 may process the output data 120 from one or more computing devices 104 and generate report data 126. For example, the output data 120 may comprise information about events involving the communication interface of computing devices 104 executing the application 108. The report data 126 may comprise a graphical depiction showing network latency by geolocation based on the output data 120. The application developer, computing device administrator, network administrator, or other entity may use the report data 126 for various purposes. The application developer may use the report data 126 to determine what aspects of the application 108 could be improved to enhance user experience. The computing device administrator may be able to select a different WCDN to use to improve performance. The network administrator may determine aspects of the network 106 that need improvement, such as geographic areas where communications are marginal.

Figure 2:
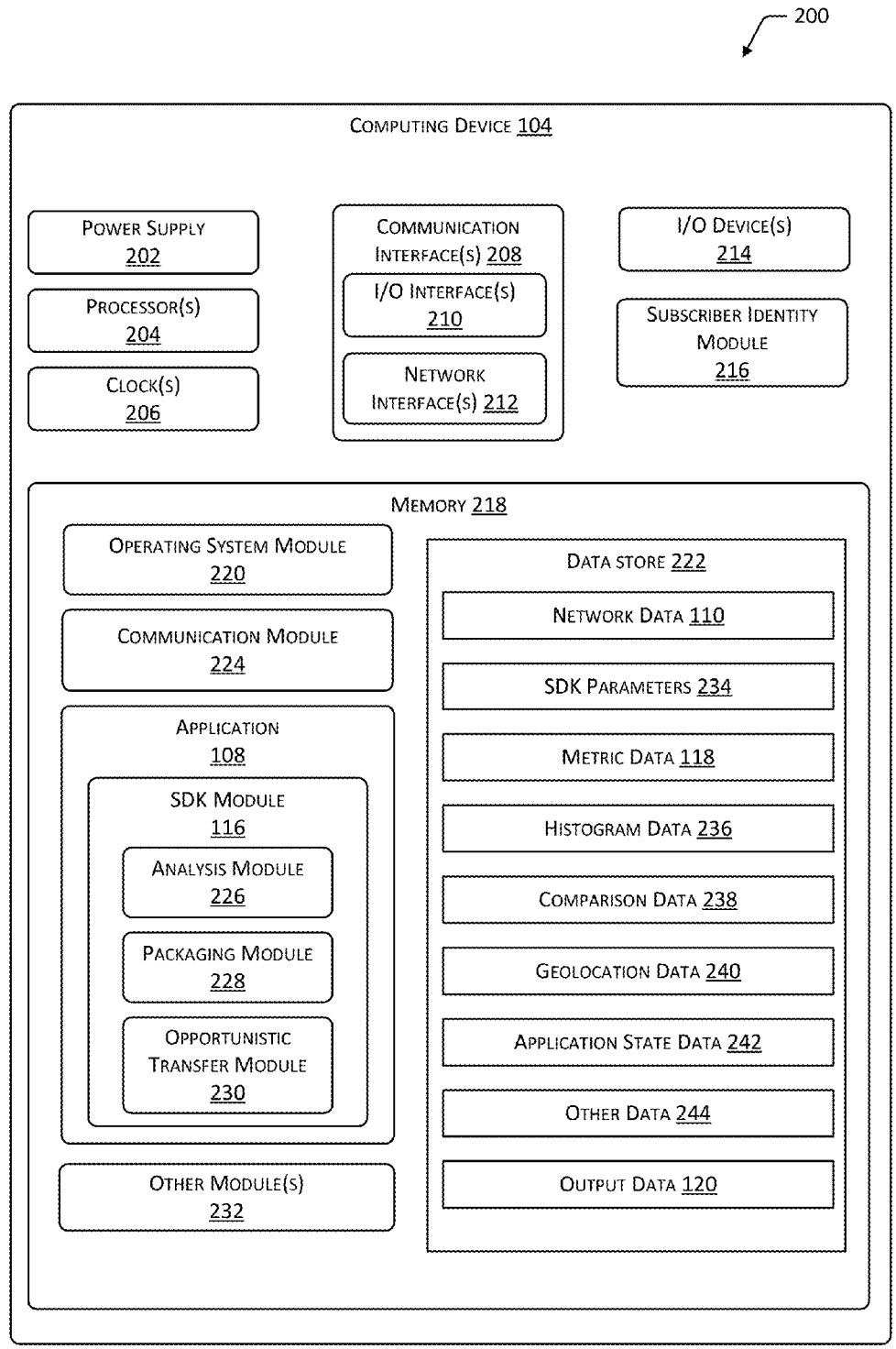
FIG. 2 is a block diagram of a computing device within the scope of the present disclosure at which output data indicative of network characteristics may be acquired, according to one implementation.

FIG. 2 is a block diagram 200 of the computing device 104 within the scope of the present disclosure at which output data 120 indicative of network characteristics may be acquired, according to one implementation. The computing device 104 may include workstations, embedded devices, game consoles, mobile devices, and so forth. Any type of computing device 104 and any number of networked computing devices 104 may perform the implementations described herein.

One or more power supplies 202 may be configured to provide electrical power suitable for operating the components of the computing device 104. In some implementations, the power supply 202 may include a rechargeable battery, fuel cell, photovoltaic cell, power conditioning circuitry, and so forth.

The computing device 104 may include one or more hardware processor(s) 204 (processors) configured to execute one or more stored instructions. The processor(s) 204 may include one or more cores. One or more clocks 206 may provide information indicative of date, time, ticks, and so forth. For example, the processor(s) 204 may use data from the clock 206 to generate a timestamp, trigger a preprogrammed action, and so forth.

The computing device 104 may include one or more communication interfaces 208, such as input/output (I/O) interfaces 210, network interfaces 212, and so forth. The communication interfaces 208 may enable the computing device 104, or components of the computing device 104, to communicate with other devices or components of the computing device 104. The I/O interfaces 210 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 210 may couple to one or more I/O devices 214. The I/O devices 214 may include any manner of input device or output device associated with the computing device 104. For example, I/O devices 214 may include touch sensors, keyboards, mouse devices, microphones, image sensors (e.g., cameras), scanners, displays, speakers, haptic devices, printers, positioning devices, and so forth. The positioning device may comprise one or more of a satellite radionavigation system, inertial navigation system, terrestrial radionavigation system, or other device configured to generate data indicative of the geolocation. For example, the satellite radionavigation system may comprise a Global Positioning System (GPS) receiver, the terrestrial radionavigation system may utilize information from the network access points, and so forth. In some implementations, the I/O devices 214 may be physically incorporated with the computing device 104 or may be externally placed.

The network interfaces 212 may be configured to provide communications between the computing device 104 and other devices, such as the I/O devices 214, routers, access points, and so forth. The network interfaces 212 may include devices configured to couple to one or more networks 106 including LANs, WLANs, wide area networks (WANs), WWANs, and so forth. For example, the network interfaces 212 may include devices compatible with Ethernet, Wi-Fi®, Bluetooth®, ZigBee®, Z-Wave, 3G, 4G, LTE, and so forth.

The computing device 104 may include one or more busses or other internal communications hardware or software that allows for the transfer of data between the various modules and components of the computing device 104.

The computing device 104 may include a subscriber identity module (SIM) 216. The SIM 216 may comprise a non-transitory computer-readable storage media that may store information such as an international mobile subscriber identity (IMSI) number, cryptographic keys, integrated circuit card identifier (ICCID), contact information, or other data. The SIM 216 may be used by the network interface 212 for communication with one or more of the networks 106. For example, the IMSI and cryptographic keys stored in the SIM 216 may be retrieved and used to establish communication with a WCDN.

As shown in FIG. 2, the computing device 104 may include one or more memories 218. The memory 218 may include one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 218 may provide storage of computer-readable instructions, data structures, program modules, and other data for the operation of the computing device 104. A few example modules are shown stored in the memory 218, although the same functionality may alternatively be implemented in hardware, firmware, or as a system on a chip (SoC).

The memory 218 may include one or more operating system (OS) modules 220. The OS module 220 may be configured to manage hardware resource devices such as the I/O interfaces 210, the network interfaces 212, the I/O devices 214, and to provide various services to applications or modules executing on the processors 204. The OS module 220 may implement a variant of the FreeBSD® operating system as promulgated by the FreeBSD Project; UNIX® or a UNIX-like operating system; a variation of the Linux® operating system as promulgated by Linus Torvalds; the Windows® operating system from Microsoft Corporation of Redmond, Wash., USA; the Mac OS® or iOS™ promulgated by Apple Inc. of Cupertino, Calif., USA; VXWorks promulgated by Wind River of Alameda, Calif., USA; or other operating systems.

A data store 222 and one or more of the following modules may also be stored in the memory 218. The modules may be executed as foreground applications, background tasks, daemons, and so forth. The data store 222 may use a flat file, database, linked list, tree, executable code, script, or other data structure to store information. In some implementations, the data store 222 or a portion of the data store 222 may be distributed across one or more other devices including other computing devices 104, network attached storage devices, and so forth.

The memory 218 may store a communication module 224, the application 108, the SDK module 116, an analysis module 226, a packaging module 228, an opportunistic transfer module 230, or other module 232.

The communication module 224 may be configured to establish communications with one or more other devices using one or more of the communication interfaces 208. Communications may be authenticated, encrypted, and so forth. For example, the communication module 224 may utilize digital certificates to authenticate the identity of devices involved in the communication. The communication module 224 may be configured to establish a virtual private network (VPN) connection or tunnel with the external device 112.

The memory 218 may store the application 108. As described above, in some implementations, the application 108 may incorporate at least a portion of a SDK module 116. Elements of the SDK module 116 may be configured to execute on the one or more hardware processors 204. These elements may execute within a user space, as compared to a kernel space of an operating system (OS) module 220 executing on the computing device 104. For example, the application 108 and the elements of the SDK module 116 may execute with privileges of a user account, with the user account having privileges within the OS that are lesser than a root account, superuser, administrator, or other type of elevated account.

The application 108 may store network data 110 in the data store 222. For example, network data 110 received from an external device 112 may be stored in the data store 222. In another example, network data 110 generated by the application 108 may be stored in the data store 222.

The SDK module 116 may be configured to direct the network data 110 to a particular device such as the external device 112. The SDK module 116 may be configured to direct the output data 120 to the analysis server 122. In one implementation, the SDK module 116 may implement or call on VPN functionality, such as provided by the communication module 224. For example, the SDK module 116 may issue a request to the communication module 224 to establish one or more encrypted tunnels to one or more of the external device 112 or the analysis server 122. Once established, the network data 110, output data 120, or both may be directed through the VPN to their respective destination devices.

Operation of the SDK module 116 may be configured at least in part by one or more SDK parameters 234. For example, the SDK parameters 234 may specify the address of the analysis server 122, thresholds used to determine occurrence of an event, and so forth. Thresholds may also include maximum values, minimum values, ranges of values, percentages, time-varying functions, and so forth.

The SDK module 116 may store the metric data 118 in the data store 222. In some implementations the metric data 118 may be stored in a particular data structure, such as a buffer. For example, the metric data 118 may be stored in a circular buffer. The buffer may be configured such that as more recent (or newest) metric data 118 is added to the buffer less recent (or older) metric data 118 is overwritten or removed from the buffer.

The analysis module 226 may be stored in the memory 218. In some implementations, the analysis module 226 may be a portion of the SDK module 116. The analysis module 226 acquires metric data 118 indicative of operation of the computing device 104. As described above, the metric data 118 may be indicative of network characteristics associated with communication involving a communication interface 208, such as the network interface 212.

The analysis module 226 may be configured to acquire data at different data collection rates. For example, during times when the network interface 212 is unused or used at levels below a threshold, the analysis module 226 may acquire the metric data 118 at a first data collection rate. This metric data 118 may be used to generate output data 120. Based at least in part on the output data 120, the analysis module 226 may transition to a second data collection rate that is greater than the first data collection rate. For example, the first data collection rate may comprise 10 samples per second. Where the output data 120 is indicative of an increase in the number of bytes of network data 110 transferred exceeding a threshold value, the analysis module 226 may increase to the second data collection rate of 1000 samples per second. Similarly, if the output data 120 indicates a drop below a threshold, the data collection rate may be decreased. As a result, the data collection rate or sample frequency may dynamically adjust. For example, as the amount of network data 110 being transferred increases, the data collection rate may increase.

The transition from the first data collection rate to the second data collection rate may involve adjusting a clock 206 or timer associated with the data collection. In other implementations, the transition may comprise discontinuing acquisition at the first data collection rate and starting acquisition at the second data collection rate.

By dynamically adjusting, the quantity of output data 120 that is generated by the SDK module 116 is reduced compared to constant acquisition of data at the second or higher data collection rate. This reduction, in combination with operation of the opportunistic transfer of the output data 120 described below, further minimizes the impact of operation of the SDK module 116 on the resources of the system 100. The adjustment of the data collection rate is discussed in more detail below with regard to FIG. 4.

The analysis module 226 may generate histogram data 236. For example, the analysis module 226 may determine a set of bins. The bins may comprise an interval extending from a first endpoint to a second endpoint. The bins may have the same interval sizes or may have different interval sizes. For example, the bins may have equal interval sizes, with endpoints from 0-5, 6-10, 11-15, 16-20, and so forth. In another example, the bins may have unequal interval sizes such as 0-1, 2-25, 26-35, 36-50, and so forth.

Once the intervals that describe the bins have been determined, the metric data 118 or a portion thereof may be "binned". During binning, values of metric data 118 are associated with a particular bin. For example, the metric data 118 having a value of "7" would be associated with the bin describing the interval of 6-10.

The analysis module 226 may generate histogram data 236 from the binned information. The histogram data 236 may indicate a particular bin and a frequency or count of the number of values of metric data 118 that are within that particular bin. The histogram data 236 is described in more detail with regard to FIG. 5.

The histogram data 236 may be further processed by the SDK module 116 to generate other information, such as percentile values, minimum value, maximum value, average value, mode, and so forth. The SDK module 116 may use other analytical techniques instead of, or in addition to, generating the histogram data 236. For example, a curve may be fitted to the metric data 118.

The analysis module 226 may generate comparison data 238. The comparison data 238 may result from the comparison of two or more pieces of metric data 118, or of data based on the metric data 118. For example, the comparison data 238 may be based on a difference between metric data 118(1) from a first time and metric data 118(2) from a second time. The comparison data 238 is described in more detail with regard to FIG. 6.

One or more of the metric data 118, the histogram data 236, the comparison data 238, and so forth, may be used to generate the output data 120. For example, histogram data 236(1) for a network characteristic may be generated using metric data 118 associated with time ("t")=0 and histogram data 236(2) may be generated using metric data 118 associated with time=1. Percentile data may be generated for the histogram data 236 at these times, and then subtracted. The difference in the percentiles may be compared with a threshold value, such as specified in the SDK parameters 234. If the difference exceeds the threshold value, an event may be determined and output data 120 descriptive of the event is generated.

In some implementations, the analysis module 226 may generate predictive output data. The predictive output data may comprise output data 120 that is speculative, for a future time. For example, given the short time frame, a linear approximation based on two or more prior values of the output data 120 may be used to predict a future value of the output data 120. In some implementations, the transition between data collection rates or other operations of the system may be responsive to the predicted value.

The output data 120 may include additional information. For example, geolocation data 240 may comprise information indicative of a geographic location associated with the metric data 118. The geolocation data 240 may be obtained from the positioning device. The geolocation data 240 may be indicative of a latitude and longitude, altitude, street address, postal code, state, country, building, room, transmitter identification number, and so forth. For example, the geolocation data 240 may comprise information indicative of a particular cellular tower.

The output data 120 may include application state data 242. The application state data 242 provides information associated with operation of the application 108. For example, the application state data 242 may indicate a network address that the application 108 is communicating with, register values, and so forth.

Other data 244 may also be incorporated into the output data 120. The other data 244 may include information such as battery power remaining, status of the communication interface 208, clock 206 speed, unique device identifier, application identifier, and so forth.

The packaging module 228 may assemble one or more of the metric data 118, the histogram data 236, the comparison data 238, the geolocation data 240, the application state data 242, or the other data 244 to produce the output data 120. For example, the packaging module 228 may associate geolocation data 240 with the comparison data 238. The packaging module 228 is described in more detail with regard to FIG. 6.

The opportunistic transfer module 230 may be used to opportunistically schedule transmission of the output data 120 to the analysis server 122. Such scheduling may reduce impact associated with sending the output data 120. For example, the transmission may be scheduled to minimize contention between the output data 120 and the network data 110, minimizing power consumption by reducing duration of full-power operation of a radio in the communication interface 208, and so forth.

Based at least in part on one or more of the output data 120, the histogram data 236, the comparison data 238, and so forth, the opportunistic transfer module 230 may determine that an opportunistic transfer window is available for transmission of the output data 120. This determination may be based at least in part on a change in one or more of the network characteristics as expressed in the output data 120. For example, the output data 120 may indicate a trend of decreasing number of packets sent per unit of time. This may be suggestive that the demand by the application 108 for bandwidth is decreasing. Responsive to this, the analysis module 226 may transition from the faster second data collection rate back to the slower first data collection rate.

The opportunistic transfer module 230, determining that the communication interface 208 is still active but may now be underutilized, adds at least a portion of the output data 120 to a transmission queue. In some implementations, the opportunistic transfer module 230 may limit the quantity of the output data 120 per unit time. For example, the opportunistic transfer module 230 may be configured to send only a single packet of output data 120 no more frequently than every 5 minutes. This limitation on the amount of data to prevent the output data 120 from keeping the communication interface 208 in an active state only for the output data 120. For example, by limiting the quantity of data sent over the span of several seconds or minutes, the opportunistic transfer module 230 avoids the situation where an occasional packet of output data 120 keeps the communication interface 208 in a high power mode but is otherwise unused.

The opportunistic transfer module 230 may be configured to time the transmission of the output data 120 to minimize or prevent the communication interface 208 from remaining in a particular mode. For example, the opportunistic transfer module 230 may be configured to not send the output data 120 when the radio of the wireless network interface 212 is determined to be in a low power mode. Instead, the opportunistic transfer module 230 may append the output data 120 to an outgoing queue of packets that are being transmitted while the radio is at full power. For example, the opportunistic transfer module 230 may designate the beginning of an opportunistic transfer window as occurring when network data 110 is still being transferred, and thus the radio is still on, but the rate at which network data 110 is being transferred has decreased at a rate greater than a threshold amount during a specified time period. In this way, the system 100 avoids bringing the radio from a standby state to a full power state to send the output data 120. This technique may reduce consumption of electrical power, extend battery life, minimize overall congestion on a communication channel, and so forth.

The opportunistic transfer module 230 may encounter situations where the quantity of output data 120 to be sent may exceed the capacity of the opportunistic transfer window. The output data 120 may be further processed to facilitate transmission. For example, older output data 120 may be discarded in favor of transmitting newer output data 120, a subset of output data 120 may be sent, a digest of the output data 120 may be created and sent, output data 120 may be stored for later transfer, and so forth. The opportunistic transfer window is discussed in more detail with regard to FIG. 4.

Figure 3:
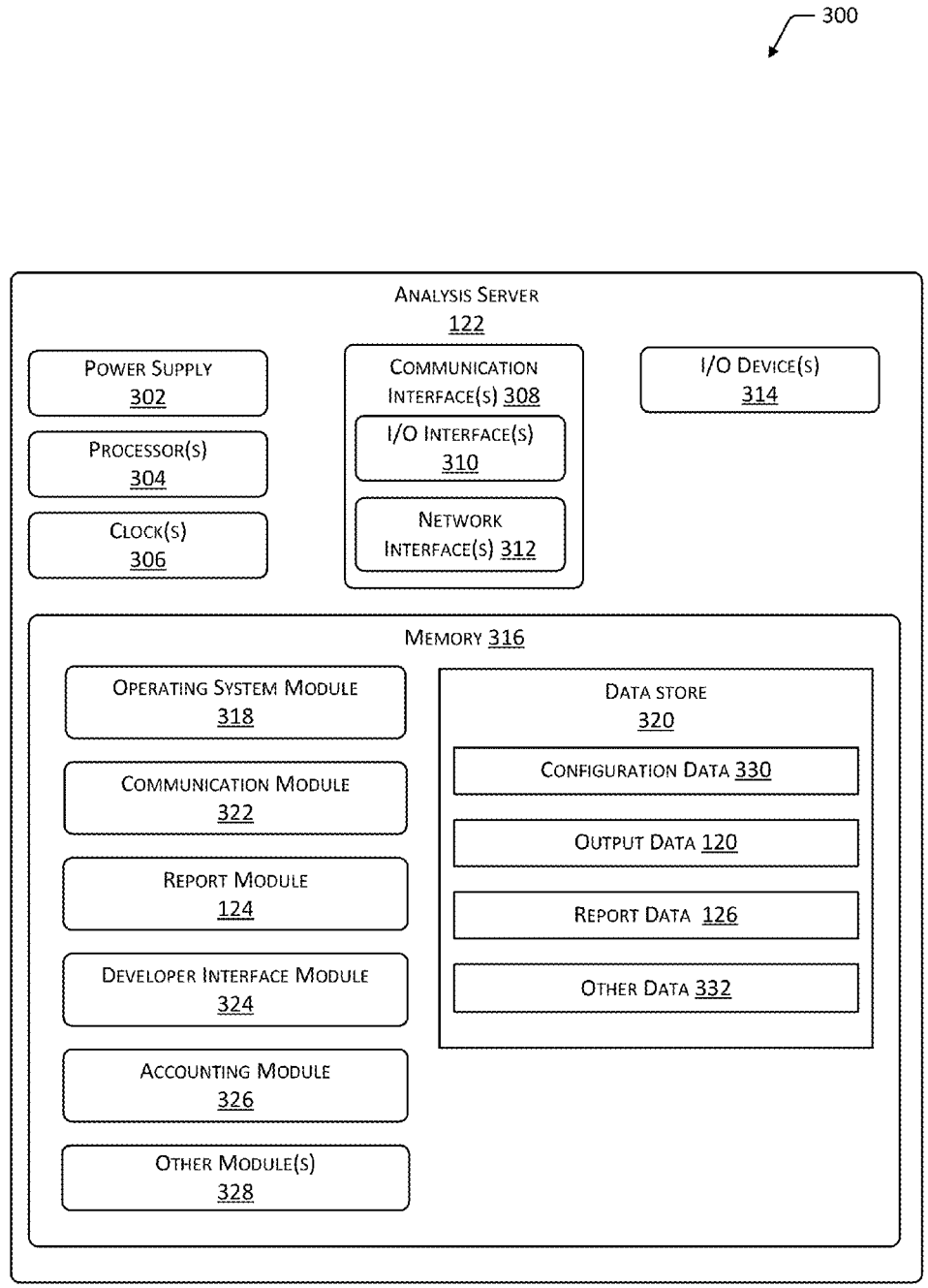
FIG. 3 is a block diagram of an analysis server within the scope of the present disclosure, according to one implementation.

FIG. 3 is a block diagram 300 of a computing device 104 acting as an analysis server 122 within the scope of the present disclosure, according to one implementation.

Similar to the computing device 104 described above with regard to FIG. 2, the analysis server 122 may include one or more of: power supplies 302, hardware processor(s) 304 (processors), clocks 306, or communication interfaces 308. The communication interface 308 may include I/O interfaces 310, network interfaces 312, and so forth.

The I/O interface(s) 310 may couple to one or more I/O devices 314. The I/O devices 314 may include any manner of input device or output device, such as described above with regard to FIG. 2. For example, the analysis server 122 may connect to the computing device 104 using a USB connection. In some implementations, the I/O devices 314 may be physically incorporated with the analysis server 122 or may be externally placed.

The network interfaces 312 may be configured to provide communications between the analysis server 122 and other devices. As described above with regard to FIG. 2, the network interfaces 312 may include devices configured to couple to one or more networks 106.

The analysis server 122 may include one or more busses or other internal communications hardware or software that allows for the transfer of data between the various modules and components of the analysis server 122.

As shown in FIG. 3, the analysis server 122 may include one or more memories 316, such as described above with regard to FIG. 2. The memory 316 may include one or more non-transitory CRSM. The memory 316 may provide storage of computer-readable instructions, data structures, program modules, and other data for the operation of the analysis server 122. A few example modules are shown stored in the memory 316, although the same functionality may alternatively be implemented in hardware, firmware, or as a SoC.

The memory 316 may include one or more OS modules 318, such as described above with regard to FIG. 2.

A data store 320 and one or more of the following modules may also be stored in the memory 316. The modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including other computing devices 104, network attached storage devices, and so forth.

Modules in the memory 316 may include a communication module 322, the report module 124, a developer interface module 324, an accounting module 326, or other modules 328.

The communication module 322 may be configured to establish communications with one or more other devices using one or more of the communication interfaces 308. Communications may be authenticated, encrypted, and so forth. For example, the communication module 322 may utilize digital certificates to authenticate the identity of devices involved in the communication.

The communication module 322 may be configured to communicate with the computing devices 104 and obtain the output data 120. The communication module 322 may be configured to receive the output data 120 in real time or near real time during use of the application 108. For example, the output data 120 may be generated while the application 108 executing on the computing device 104 is exchanging network data 110 with the external device 112 by way of the network 106.

The report module 124 may be configured to process output data 120 received from one or more of the computing devices 104 to generate the report data 126. The output data 120 may be stored in the data store 320. Configuration data 330 may be used to modify or control operation of the report module 124 or other modules 328 of the analysis server 122. The configuration data 330 may specify one or more thresholds, reporting preferences, and so forth. For example, the report module 124 may process the output data 120 to generate report data 126 indicating that one or more of the network characteristics for a group of the computing devices 104 have exceeded or fallen below a specified threshold. The configuration data 330 may specify details about how the output data 120 is processed, what to include in the report data 126, and a value of the specified threshold. In some implementations, the report module 124 may implement one or more machine learning systems to recognize trends, determine alarm conditions, and so forth.

The developer interface module 324 provides interface functionality to the developer or an application used by the developer. For example, the developer interface module 324 may present a user interface for the developer to select particular network characteristics, geolocation data, thresholds, and so forth, that are of interest. The developer interface module 324 may also be used by the developer to specify a particular type of report presentation, such as columnar data, graphs, and so forth.

The report data 126 may be used to determine if the application 108 is experiencing problems communicating using the network 106, determine issues associated with operation of the network 106, and so forth.

The accounting module 326 may be configured to determine and assess charges associated with the use of the system 100. For example, the accounting module 326 may provide the developer with a cost to generate the report data 126, to provide access a particular report, and so forth.

The other module(s) 328 may perform one or more of other functions. For example, the other modules 328 may include a user authentication module.

In some implementations, one or more of the modules may be stored at least in part in the memory of other devices, may be executed at least in part on the other devices, and so forth. For example, one or more functions associated with the accounting module 326 may execute on another server.

Other data 332 stored within the data store 320 may include information such as configurations and settings associated with the analysis server 122 or modules thereof.

Figure 4:
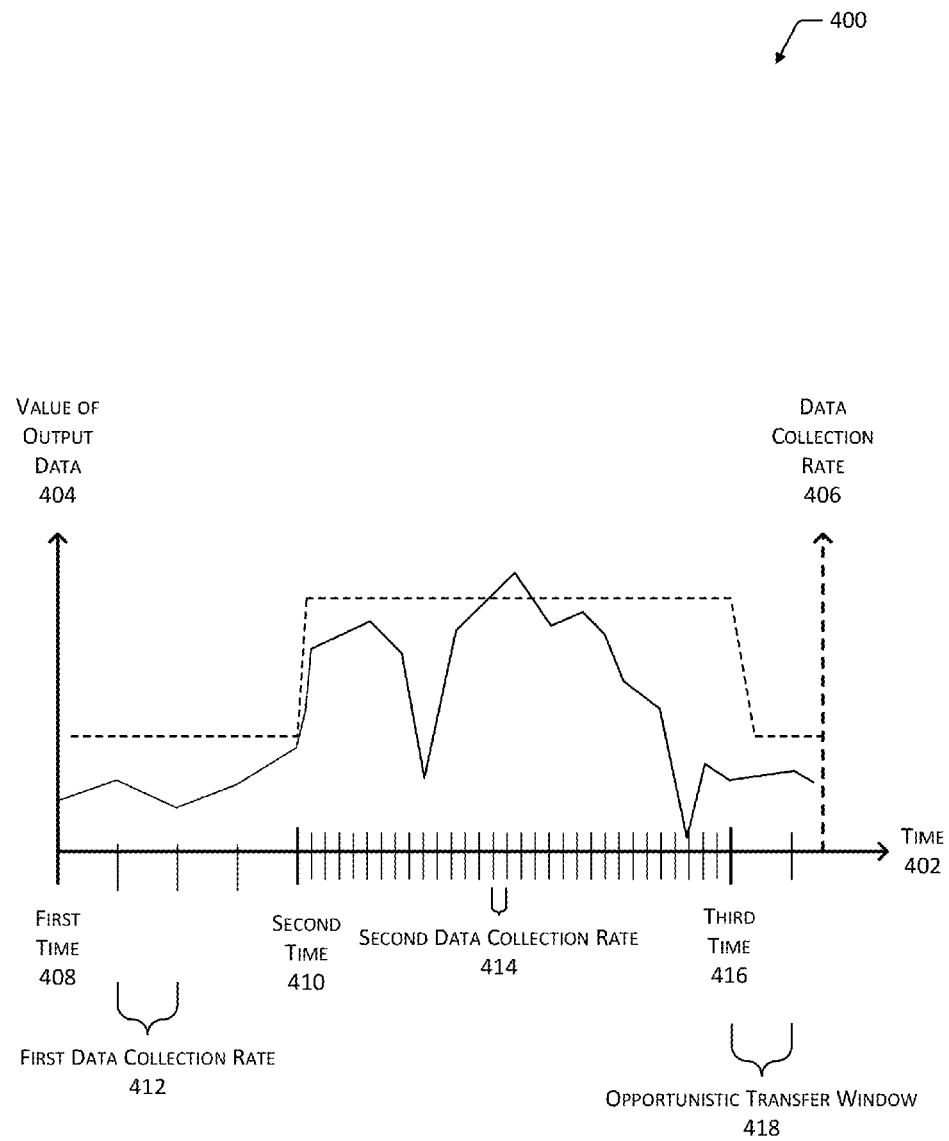
FIG. 4 is graph illustrating some aspects of the system, according to one implementation.

FIG. 4 is graph 400 illustrating some aspects of the system 100, according to one implementation. In this graph 400, a horizontal axis is indicative of time 402, increasing left to right. A first vertical axis (to the left) is used to indicate value of output data 404, as indicated by a solid line in the graph 400. For example, the solid line may be indicative of data transfer through the network interface 212 to the network 106 as expressed in the output data 120. A second vertical axis (to the right) is superimposed to indicate a data collection rate 406. The data collection rate 406 is indicative of a number of samples of metric data 118 acquired per unit time that are used to generate the output data 120. The data collection rate 406 may be based at least in part on one or more of the metric data 118 or the output data 120 (that is itself based on the metric data 118). In this illustration, from a first time 408 to a second time 410, the SDK module 116 acquires the metric data 118 at a first data collection rate 412. For example, the values of the output data 120 acquired during the time from the first time 408 and the second time 410 may be below a threshold.

Approaching the second time 410, the output data 120 indicates a change. For example, the rate of change in the intervals leading up to the second time 410 may have exceeded the threshold. Responsive to the change in the output data 120, the SDK module 116 transitions to acquiring the metric data 118 at a second data collection rate 414. The second data collection rate 414 may be maintained from the second time 410 until the third time 416, when the value of the output data 404 exhibits another change that drops below the threshold. After the third time 416, the SDK module 116 may transition to the first data collection rate 412, or another data collection rate. The second data collection rate 414 may be greater than the first data collection rate 416. For example, the first data collection rate 412 may be 10 samples of metric data 118 per second, while the second data collection rate 412 may be 1000 samples per second.

Because of the relatively short time scales involved in the data collection, particularly during the second data collection rate 414, certain assumptions about the behavior of the values of the output data 404 may be made. For example, given the short time frame, a linear approximation based on two or more prior values of the output data 120 may be used to predict a future value of the output data 120. In some implementations, the output data 120 may be indicative of these predicted values. For example, the analysis module 226 may generate data indicative of a predictive value for t=4 based on the values of output data 120 at t=2 and t=3.

The opportunistic transfer module 230 may be responsive to the output data 120, or changes thereto, to determine when to send the output data 120 to the analysis server 122. The opportunistic transfer module 230 may be configured to determine one or more opportunistic transfer windows 418. An opportunistic transfer window 418 is a time or interval of time at which transmission of the output data 120 may be determined to have minimal impact on operation of the computing device 104. For example, due to a change in the output data 120, at third time 416 the SDK module 116 transitions from the second data collection rate 414 to a first data collection rate 412. As described above, in this illustration, the value of the output data 404 may be indicative of data transfer through the network interface 212 to the network 106. In the time leading up to the third time 416, the amount of data transferred exhibited an overall decrease. However, some network data 110 continues to be transferred. As a result, the network interface 212 is still active. For example, the radio in the wireless network interface 212 is still powered up to transfer data.

The opportunistic transfer window 418 may be indicative of the time at which there is capacity to transfer data while the network interface 212 is still active. For example, the opportunistic transfer window 418 may be the period immediately prior to a time when the network interface 212 would otherwise be transitioned to a low power mode to conserve power. By sending the output data 120 during the opportunistic transfer window 418, contention for network resources may be reduced and impact of the sending of the output data 120 may be minimized. In some implementations, the opportunistic transfer module 230 may be configured to limit transmission of output data 120. For example, the number of packets or other quantity of output data 120 transmitted may be limited within a specified time interval. In another example, the opportunistic transfer module 230 may be prohibited from activating the network interface 212 to send the output data 120, instead relying on the use of existing data transfer.

Figure 5:
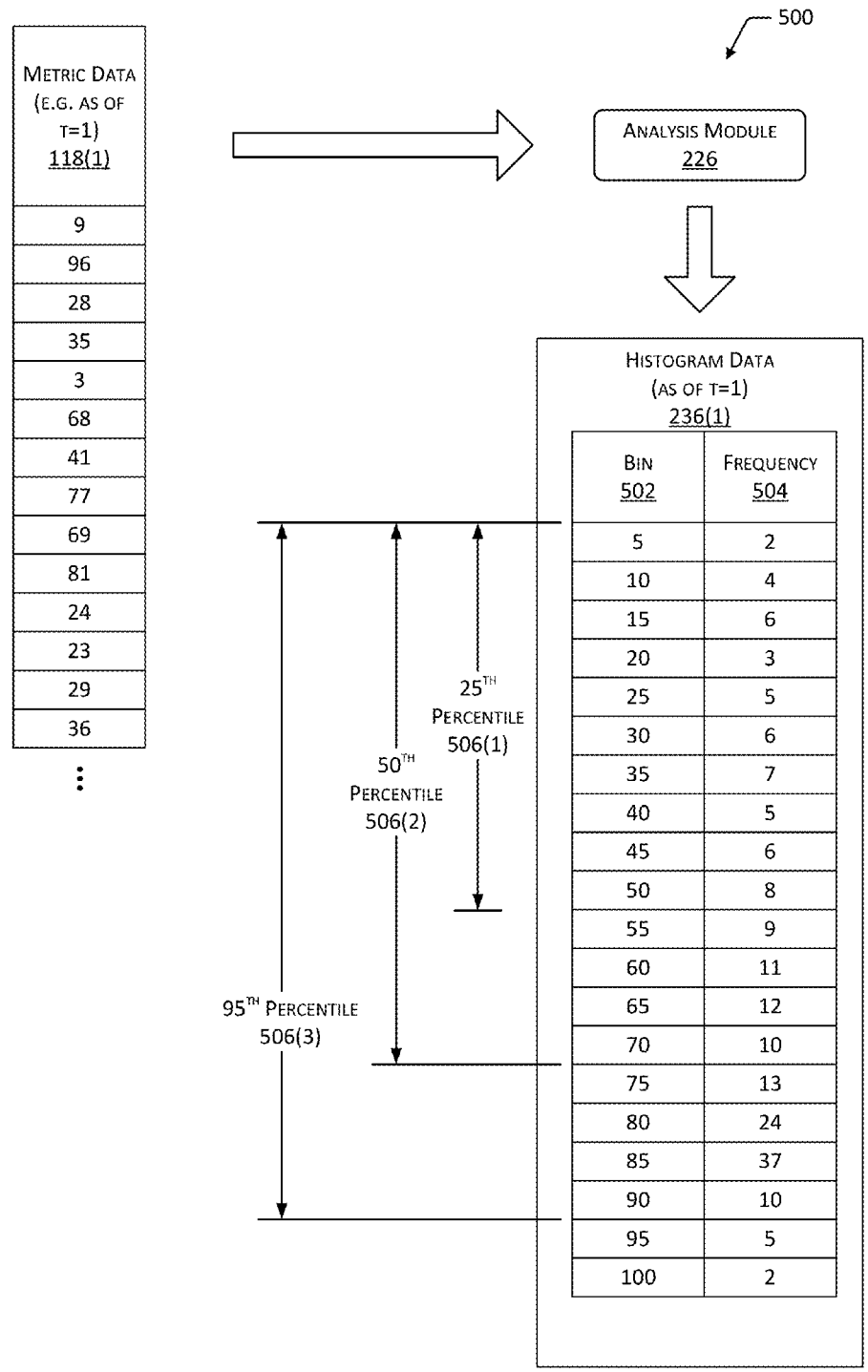
FIG. 5 is a diagram of metric data and histogram data associated with the system, according to one implementation.

FIG. 5 is a diagram 500 of metric data 118 and histogram data 236 associated with the system 100, according to one implementation. The metric data 118 may be stored in the data store 222. For example, the metric data 118 may be stored in a circular buffer, with more recent metric data 118 replacing older metric data 118. In this illustration, the metric data 118(1) includes a number of values for a particular network characteristic, up to a time "t"=1. The metric data 118 may be acquired at one or more of the data collection rates. For example, following the transition from the first data collection rate 412 to the second data collection rate 414 at the second time 410, some of the older values of the metric data 118 in a buffer may be those acquired between the first time 408 and the second time 410, while the newer values may be those acquired after the second time 410. As time 402 progresses, the older values obtained at the first data collection rate 412 are replaced with newer values of metric data 118 obtained at the second data collection rate 414.

The analysis module 226 may process the metric data 118 to generate histogram data 236. For example, the analysis module 226 may arrange the metric data 118 into bins 502 and determine a frequency 504 of the values in each bin 502. Each bin 502 is associated with a particular interval of values. The intervals of each bin 502 may be the same or may vary. The interval of a bin 502 may be specified by an operator, such as a human developer, or an automated system. For example, a developer may specify a bin size in a configuration file that is used by the SDK module 116 to set the bin 502 size.

In this illustration, the bins 502 are of equal intervals of 5. The bins 502 may be configured to encompass the range of possible values for the metric data 118 being processed. For example, the metric data 118 in this illustration may have values of 0 to 100. As a result, the bins 502 are configured to include these values. In some situations, the interval of one or more bins 502 may be modified dynamically. For example, responsive to previously determined output data 120, a particular operating mode, or other factor, the intervals of one or more bins 502 may be changed.

The histogram data 236 may be further processed by the analysis module 226 to generate additional data that may be used to produce output data 120. In one implementation, percentile 506 data may be generated from the histogram data 236. For example, the 25th percentile 506(1), 50th percentile 506(2), and 95th percentile 506(3) may be calculated. The output data 120 may comprise information indicative of these different percentiles 506, or changes to the percentiles 506 over time, such as described with regard to FIG. 6. In other implementations, the histogram data 236 may be processed to determine minima, maxima, median values, and so forth.

Figure 6:
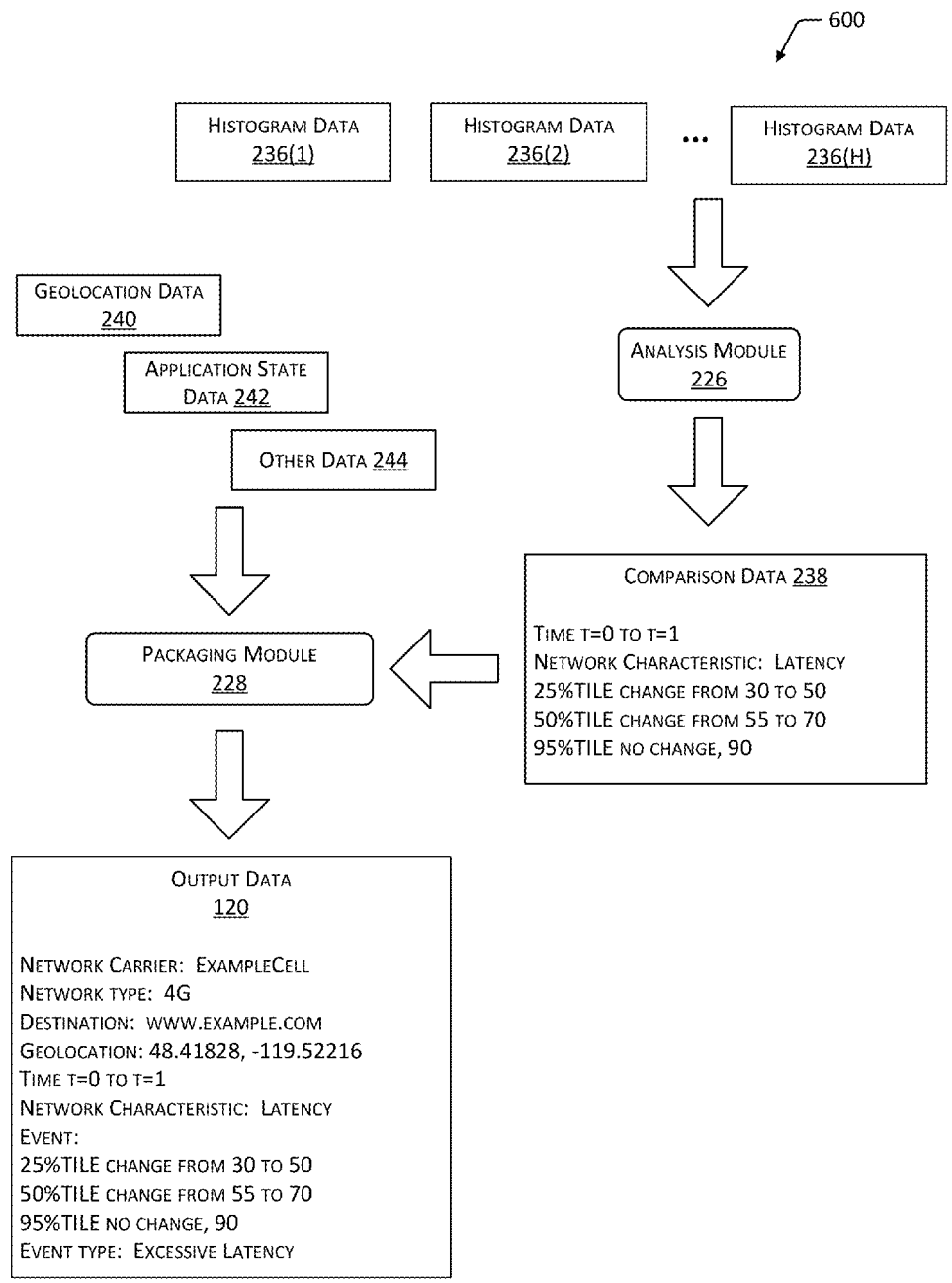
FIG. 6 illustrates the use of histogram data to generate output data indicative of network characteristics, according to one implementation.

FIG. 6 is a diagram 600 illustrating the use of histogram data 236 to generate output data 120 indicative of network characteristics, according to one implementation. The histogram data 236(1), 236(2), . . . , 236(H) associated with metric data 118 as of different times may be processed by the analysis module 226. The analysis module 226 may generate comparison data 238. The comparison data 238 is indicative of a change in the histogram data 236 from one time to another. For example, the comparison data 238 in this example indicates that, based on a comparison between histogram data 236 from t=0 to t=1, the network characteristic representative of latency has seen a change in the $25^{th}$ percentile from 30 at t=0 to 50 at t=1.

The comparison data 238 or other intermediate data generated by the analysis module 226 may be accessed by the packaging module 228. The packaging module 228 may assemble one or more of the metric data 118, the histogram data 236, the comparison data 238, the geolocation data 240, the application state data 242, or the other data 244 to produce the output data 120. For example, the packaging module 228 may associate one or more of geolocation data 240, application state data 242, or other data 244 with the comparison data 238. Continuing the example, the packaging module 228 may use data indicative of timestamp that is associated with the comparison data 238 to retrieve from the data store 222 the geolocation data 240 for that time. This geolocation data 240 may then be merged with the comparison data 238.

Once packaged, the output data 120 may be sent to the analysis server 122, another external device 112, or stored in the data store 222. The transmission of the output data 120 may be controlled at least in part by the opportunistic transfer module 230.

The SDK module 116 may be configured to generate output data 120 with the same timing as acquisition of the metric data 118. For example, if the metric data 118 is sampled 1000 times per second, the output data 120 may be generated 1000 times per second as well. In other implementations, the generation of output data 120 may occur with a different timing from that of metric data 118 acquisition. For example, the metric data 118 may be sampled at 1000 times per second and output data 120 may be generated 200 times per second. In other implementations, the output data 120 may be generated based on other occurrences, such as every n number of samples of metric data 118 acquired. For example, every 100 samples the output data 120 may be generated.

Figure 7:
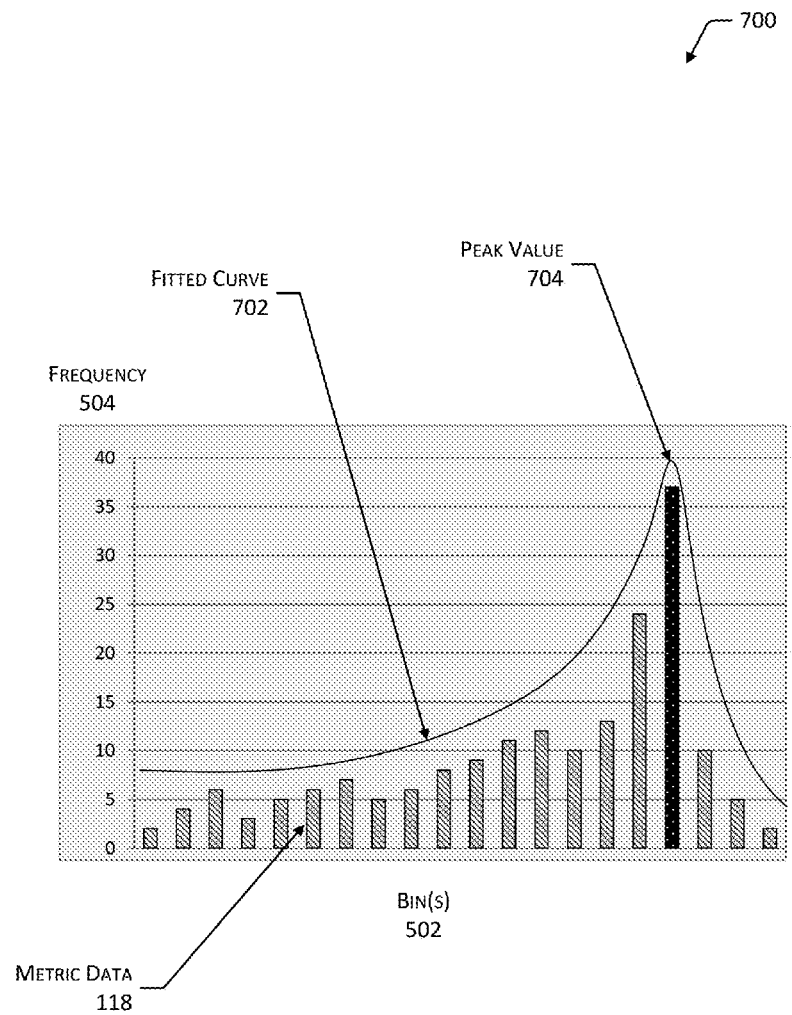
FIG. 7 is an illustration of the histogram data, according to one implementation.

FIG. 7 is an illustration 700 of the histogram data 236, according to one implementation. The histogram data 236 may be processed by the analysis module 226 using one or more techniques. For example, a curve or function may be fitted to the histogram data 236 in which bins 502 are indicated along the horizontal axis and frequency 504 is along the vertical. As shown here, a fitted curve 702 that is approximately Gaussian has been fitted to the frequency 504 of the histogram data 236. The fitted curve 702 may be used to determine other attributes of the histogram data 236, such as a peak value 704. In some implementations other information such as a slope or first derivative of the fitted curve 702 may be determined.

The curve fitting is depicted here graphically for illustration and not by way of limitation. Various techniques for curve fitting may be utilized that do not utilize a graphical representation. For example, numerical curve fitting techniques may be used.

Illustrative User Interfaces

Figure 8:
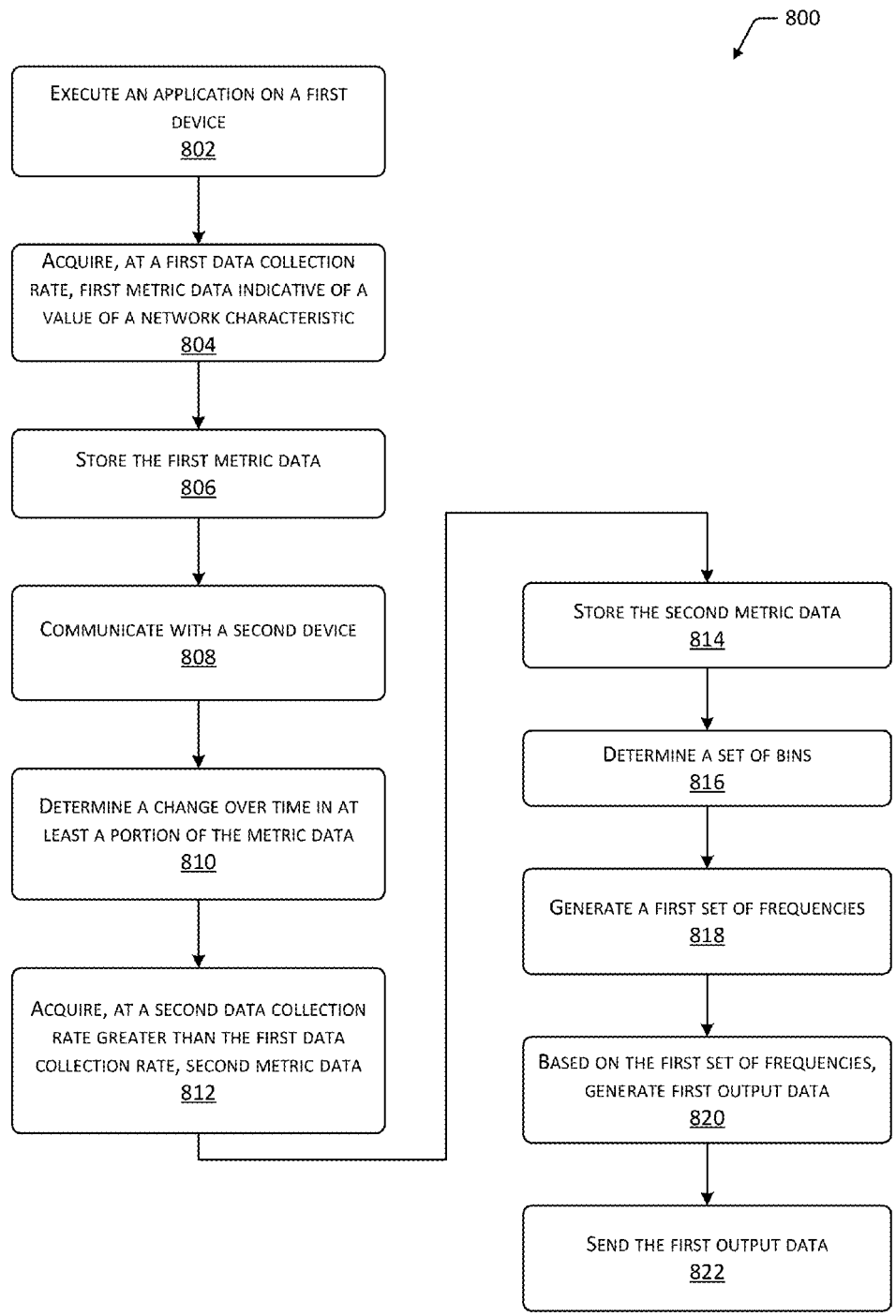
FIG. 8 is a flow diagram of a process for generating output data, according to one implementation.

FIG. 8 is a flow diagram 800 of a process for generating output data 120, according to one implementation. The process may be performed at least in part by one or more of the computing device 104, the external device 112, the analysis server 122, or another device.

At 802, an application 108 executes on a first device. For example, the application 108 may execute on the computing device 104. The computing device 104 may connect to a WCDN using a communication interface 208, such as the network interface 212.

At 804, first metric data 118(1) indicative of a value of a network characteristic is acquired at a first data collection rate 412. For example, the first network characteristic may be data throughput of the network interface 212 connected to the network 106. In some implementations, the first data collection rate 412 may be less than 20 samples per second. By operating at the first data collection rate 412, the system may reduce consumption of resources on the computing device 104. For example, power consumption may be reduced, use of the processor 204 may be reduced, and so forth.

The network characteristic may include one or more of: bandwidth, latency, number of packets sent, packet loss, transmit power, received signal strength, jitter, and so forth. In other implementations, non-network characteristics may be processed using the techniques described herein. For example, details about processor utilization, memory utilization, and so forth, may be processed in a similar fashion.

At 806, the first metric data 118(1) obtained at the first data collection rate 412 is stored. In some implementations, the first metric data 118(1) may be stored in a buffer. The buffer may be configured such that newest values are added to the buffer and older values are removed from the buffer during operation.

At 808, communication with a second device may occur using the communication interface 208. For example, the application 108 may exchange network data 110 with an external device 112. Metric data 118 may then result, indicative of this communication.

At 810, a change over time in at least a portion of the first metric data 118(1) stored in the buffer may be determined. In some implementations, the change may be compared to a threshold. For example, a magnitude of the change may be determined to exceed a first threshold. Continuing the example, output data 120 may be generated from the first metric data 118(1) and compared to a threshold value. In some implementations, a sign or direction of the change may be compared to a threshold.

At 812, second metric data 118(2) may be acquired at a second data collection rate 414 that is greater than the first data collection rate 412. As described above, the second metric data 118(2) is indicative of a value of the network characteristic. In some implementations, the transition from the first data collection rate 412 to the second data collection rate 414 may be based at least in part on the change over time as discussed above with regard to 810. For example, the analysis module 226 may generate comparison data 238 indicative of a change in the metric values 118 that exceeds the threshold and results in output data 120 indicative of an event. In some implementations, the second data collection rate 414 may be greater than 1000 samples per second.

While operating at the second data collection rate 414, use of the computing device's 104 resources may increase as compared to operation at the first data collection rate 412. For example, while operating at the second data collection rate 414, power consumption may increase, use of the processor 204 may increase, and so forth. By adjusting between the first data collection rate 412 and the second data collection rate 414, the system may acquire useful output data 120 while minimizing use of the resources of the computing device 104.

At 814, the second metric data 118(2) obtained at the second data collection rate 414 is stored. In some implementations, the second metric data 118(2) may be stored in the buffer. The same buffer may be used for the first metric data 118(1) and the second metric data 118(2) in some implementations.

In some implementations, one or more of the operations described below with regard to 816-822 may be responsive to a determination that a quantity of data transferred using the communication interface 208 exceeds a threshold quantity. For example, when no network data 110 is being transferred, it may be deemed an unnecessary use of resources on the computing device 104 to generate output data 120 that is indicative of network characteristics. This determination may be made using one or more of metric data 118, histogram data 236, comparison data 238, and so forth.

At 816, a set of bins 502 are determined. Each bin 502 specifies an interval from a first value to a second value. The bins 502 may be predefined, such as by a developer, may be dynamically adjustable, or a combination thereof.

At 818, a first set of frequencies 504 are generated. In one implementation, for each one of the set of bins 502 a frequency 504 or count of the values in the buffer that are within the interval of the bin 502 is determined. For example, if the buffer includes two values that are within the same bin 502, the frequency 504 is a value of "2". The first set of frequencies 504 may be expressed as the histogram data 236.

At 820, based on the first set of frequencies 504, first output data 120 associated with the communication with the second device is generated. The output data 120 may be indicative of occurrence of an event. Continuing the example above, the first output data 120 may be indicative of the data throughput for a particular time. For example, the output data 120 may comprise a peak value 704 determined using a normal curve fitted to the first set of frequencies 504. Once the curve has been fitted, one or more of a maximum value, a median value, or a percentile value associated with the network characteristic may be calculated.

In some implementations, the first output data 120 maybe generated by determining one or more percentile values 506 of the first set of frequencies 504. A change in the one or more percentile values 506 may be determined as having occurred from a first time to a second time. The change may be determined to exceed a threshold change value.

At 822, the first output data 120 may be sent. For example, the SDK module 116 may use the opportunistic transport module 230 to send the output data 120 to the analysis server 122. The opportunistic transport module 230 may determine, based at least in part on the first output data 120, an opportunistic transfer window 418 in which usage of the communication interface 208 is below a threshold value indicative of utilization for a threshold period of time. Utilization may be determined based on actual bandwidth as compared to bandwidth in use, length of a queue of data for transmission, and so forth. Based on the determination that utilization is below a threshold value, the opportunistic transport module 230 may send the first output data 120 using the communication interface 208.

In another implementation, the opportunistic transport module 230 may determine an opportunistic transfer window 418, based at least in part on the first output data 120. The opportunistic transfer window 418 may be a predicted value or a value of a current or past condition.

The first output data 120 may be stored in an output buffer having a predetermined storage capacity. The opportunistic transport module 230 may determine, based at least in part on the first output data 120, the communication interface is connected to the WCDN. For example, the first output data 120 may indicate recent transfer of network data 110. The opportunistic transport module 230 may then determine, based at least in part on the first output data 120, the communication interface 208 is available for use. For example, the output data 120 may indicate that the network interface 212 is being utilized at less than 90%. The opportunistic transport module 230 may determine the output buffer is full. Responsive to utilization being less than a threshold value and the output buffer being full, the opportunistic transport module 230 may send at least a portion of the first output data 120 using the communication interface 208.

Figure 9:
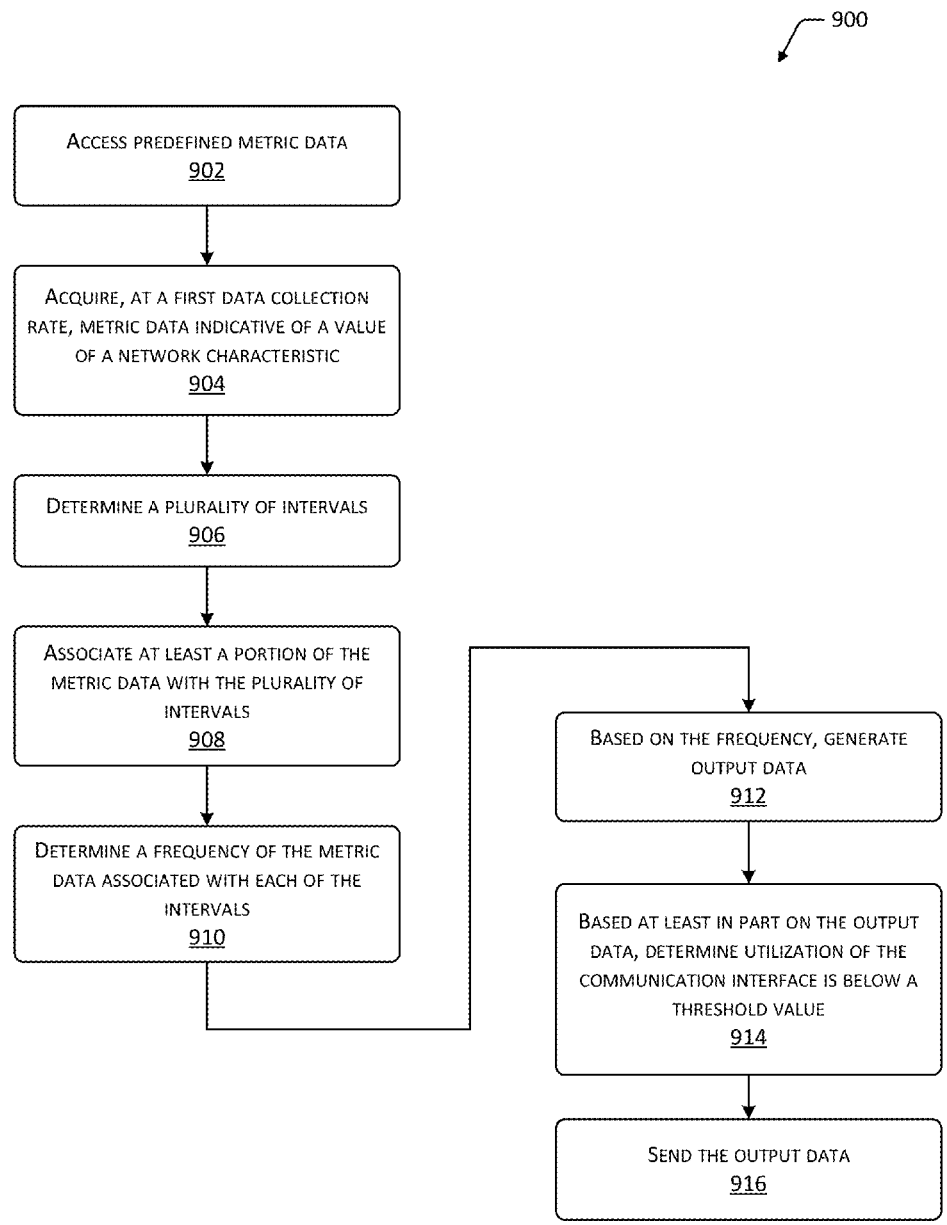
FIG. 9 is a flow diagram of another process for generating output data, according to one implementation.

FIG. 9 is a flow diagram 900 of another process for generating output data 120, according to one implementation. The process may be performed at least in part by one or more of the computing device 104, the external device 112, the analysis server 122, or another device.

At 902, the SDK module 116 may access predefined metric data 118. During startup of the SDK module 116, the lack of metric data 118 may prevent the accurate generation of output data 120. For example, if the buffer storing metric data 118 starts empty, until that buffer is filled, the resulting output data 120 may vary. To shorten the time for the generation of output data 120, in some implementations, predefined metric data 118 may be accessed. The predefined metric data 118 may comprise a previous state of the metric data 118. For example, during shutdown of the application 108, the last available set of metric data 118 may be stored in the data store 222. During startup of the application 108, the SDK module 116 may retrieve the previously stored metric data 118 and save that data to the buffer.

The predefined metric data 118 may also be stored and retrieved based on one or more other parameters, such as geolocation of the computing device 104, time of day, telecommunication company operating the network 106, and so forth. For example, the predefined metric data 118 may be generated from actual metric data 118 obtained by other users similarly situated at the same time of day, in the same geolocation, and using the same telecommunication company.

At 904, metric data 118 associated with operation of the communication interface 208 is acquired at a first data collection rate 412. For example, the first data collection rate 412 may comprise acquiring metric data 118 at intervals of 100 ms or greater, such as having a sample frequency of 10 samples per second. In other implementations, the first data collection rate 412 may be greater than the second data collection rate 414. For example, the second data collection rate 414 may comprise acquiring metric data 118 at intervals of 1 ms or less.

In some implementations, the first data collection rate 412 may be based at least in part on the one or more of geolocation data 240, application state data 242, or other data 244. For example, while using a particular function within the application 108 in a particular geographic location, the first data collection rate 412 may be greater than in another location.

As described above, the metric data 118 is associated with transfer of network data 110. For example, the network data 110 comprises traffic between the application 108 executing on the one or more hardware processors 204 of the computing device 104 and the external device 112. In some implementations, the system 100 is able to generate metric data 118 without sending particular data, such as test files, test patterns, and so forth, to assess the network 106.

At 906, a plurality of intervals are determined. Each interval extending from a first endpoint to a second endpoint. For example, the interval may be expressed as a bin 502.

In some implementations, a size of the interval may be based at least in part on the one or more of geolocation data 240, application state data 242, or other data 244. For example, in a particular city, the bins 502 may be 5 units wide for metric data 118 acquired within the city limits, and metric data 118 from areas outside of the city limits may be arranged into bins 502 that are 15 units wide.

At 908 at least a portion of the metric data 118 is associated with the plurality of intervals.

At 910, for at least a portion of the plurality of intervals, a frequency 504 of the metric data 118 associated with each of the intervals is determined.

At 912, based at least in part on the frequency 504, output data 120 associated with operation of the communication interface 208 is generated. In one implementation, a percentile value from the plurality of frequencies 504 of the at least a portion of the plurality of intervals is determined. A change in the percentile values from a first time 408 to a second time 410 may be determined. Responsive to the change exceeding a threshold change value, data indicative of occurrence of an event may be generated and stored as the output data 120.

As described above the packaging module 228 may access data indicative of one or more of a geographic location of the computing device 104, a type of the computing device 104, an operating system associated with the computing device 104, a network type, and so forth. This information, or information based on it, may be bundled with intermediate data such as comparison data 238 to create the output data 120.

At 914, based at least in part on the output data 120, utilization of the communication interface 208 may be determined to be below a threshold. In one implementation, the output data 120 may be used to determine the communication interface 208 is transferring data. For example, the output data 120 may indicate a percentage of bandwidth that is available. Based at least in part on the output data 120, it may be determined that utilization of the communication interface 208 is below a threshold value.

As described above with regard to FIG. 7, in some implementations, a curve may be fit to at least a portion of the frequencies 504 for at least a portion of the plurality of intervals or bins 502.

At 916, the output data 120, or information based at least in part on the output data 120, is sent. For example, responsive to the determination that utilization is below the threshold, the opportunistic transfer module 230 may initiate transmission of the output data 120.

The transition between data collection rates may be responsive to the output data 120 such as described above. For example, the same conditions that result in an opportunistic transfer window 418 may also indicate a decrease in the utilization of the communication interface 208. Continuing the example, the SDK module 116 may transition to a second data collection rate 414 less than the first data collection rate 412 following the opportunistic transfer window 418.

Figure 10:
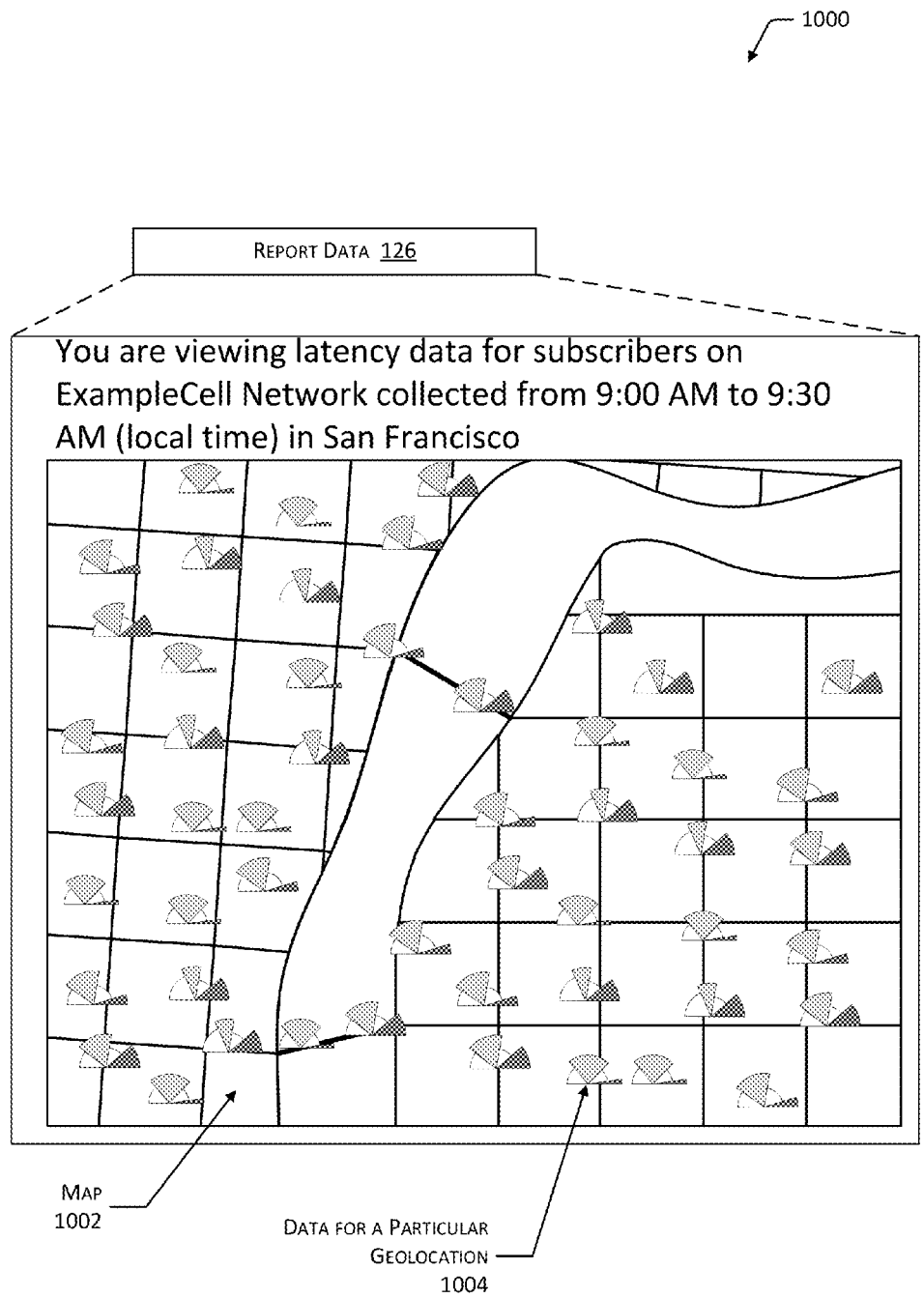
FIG. 10 is an illustration of a user interface depicting a graphical representation of output data, according to one implementation.

FIG. 10 is an illustration of a user interface 1000 depicting a graphical representation of output data 120, according to one implementation. For example, the report data 126 may build a graphical representation in a "heat map" style that includes a map 1002 and data for particular a geolocation 1004.

The graphical representation may be based on output data 120 that is constrained with respect to one or more parameters such as time, geolocation, mobile device in use, and so forth. For example, the graphical representation may present information that is collected during a specified interval of time, such as from 9:00 AM to 9:30 AM as depicted here. Continuing the example, the parameters of the graphical representation may also specify a geolocation, such as information that was obtained in the city of San Francisco.

By placing the data for a particular geolocation 1004 at the corresponding location on the map 1002, the developer or other entity may be able to determine trends or particular problem areas that may affect operation of the application 108. For example, the WCDN in a particular portion of the city may not yet be upgraded and as a result is only capable of supporting 2G connections, while other portions of the city support 4G service. By seeing information such as the type of network connection and the lower throughput and increased latency experienced by those users in a particular portion of the city, the developer may be able to modify the operation the application 108 to improve performance under the conditions of the slower network that is available in that portion of the city.

By using the techniques described in this disclosure, the output data 120 and the resulting report data 126 may be generated for the application 108 while in use, with minimal overhead on the associated computing device 104. As a result, valuable real-world data about performance may be gathered and subsequently used to improve one or more of the application 108, the network 106, the computing device 104, and so forth.

Figure 11:
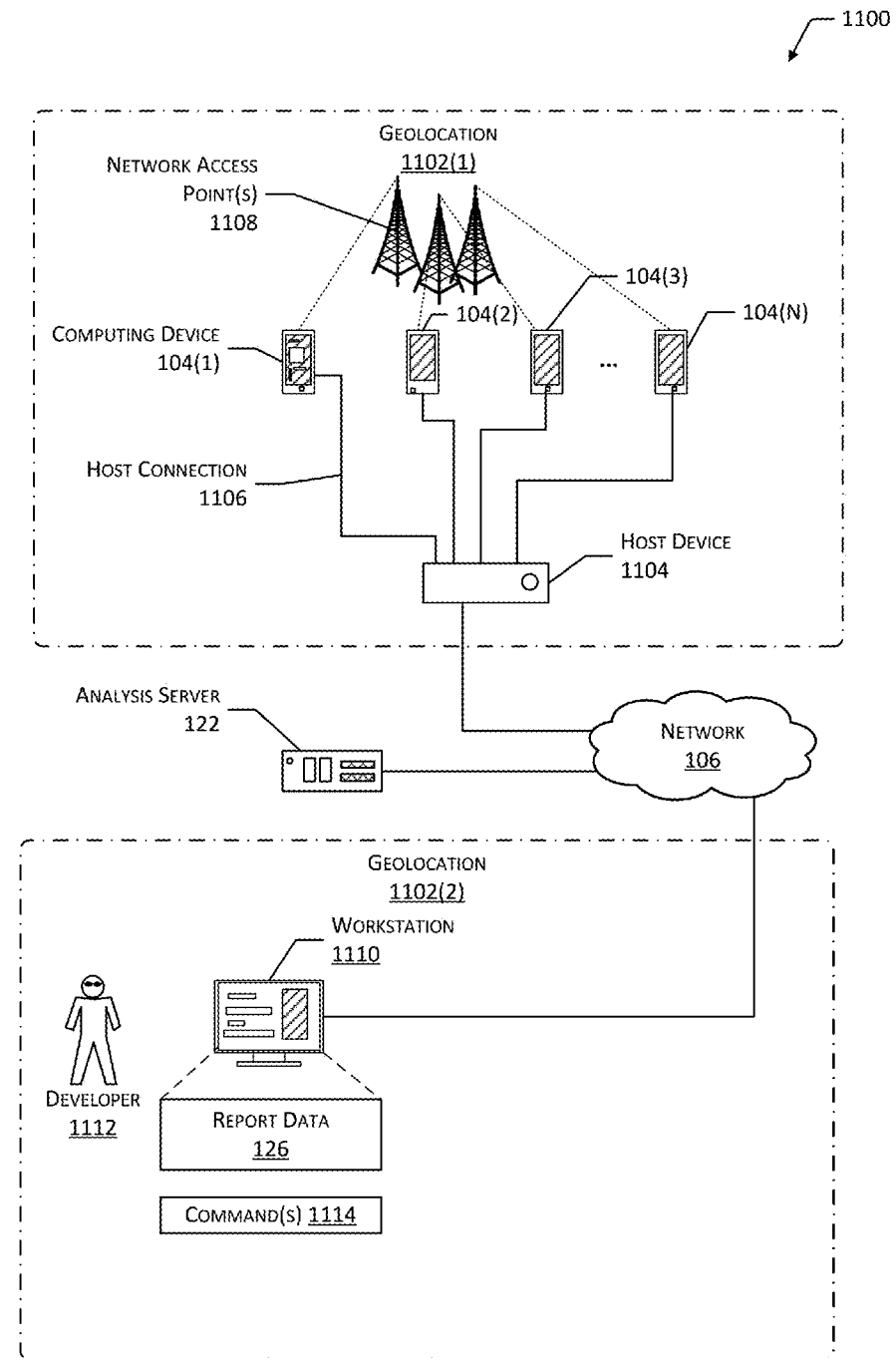
FIG. 11 depicts use of remote computing devices, according to one implementation.

FIG. 11 depicts a system 1100 to use remote computing devices, according to one implementation. In some implementations one or more of the computing devices 104(1), 104(2), . . . , 104(N) may be located at a first geolocation 1102(1). The geolocation 1102 comprises a geographic location, such as a particular room, building, city, state, country, and so forth. For example, the geolocation 1102 may be specified by a set of coordinates with regard to latitude and longitude on the surface of the Earth.

At the first geolocation 1102(1), the computing device 104 may connect to a host device 1104 using a host connection 1106. For example, the host device 1104 may comprise a server or other computing device, and the host connection 1106 may comprise a USB connection. The host device 114 establishes communication with the computing devices 104 using the host connection 1106.

One or more of the computing devices 104 may connect to WCDNs by way of a network access point 1108 using the respective network interfaces 212. For example, the computing device 104(1) may connect to network access point 1108(1) associated with a WCDN of first telecommunications carrier, the computing device 104(2) may connect to another network access point 1108(2) associated with a WCDN of a second telecommunications carrier, and so forth.

The host device 1104 may connect to the network 106. Using the network 106, the host device 1104 may communicate with the analysis server 122 or other devices, such as a workstation 1110 at a second geolocation 1102(2). The workstation 1110 may be operated by a developer 1112 or an automated system. The workstation 1110 may receive output data 120 or report data 126 associated with one or more of the computing devices 104 at the first geolocation 1102(1). For example, the output data 120 may be sent from the SDK 116 on the computing device 104(1) to the host device 1104 by way of the host connection 1106. The host device 1104 may pass the output data 120 to one or more other devices, such as the analysis server 122, the workstation 1110, and so forth.

The developer 1112 or an automated process may analyze the output data 120 or the report data 126 received from the analysis server 122. For example, the report data 126 may indicate that computing device 104(1) is not currently connected to the network access point 1108. The developer 1112 may use the workstation 1110 to generate one or more commands 1114 that are sent to the host device 1104 using the network 106. The host device 1104 may initiate one or more actions based on those commands 1114, pass the commands 1114 on to the computing device 104, and so forth. Continuing the example, the commands 1114 may direct the computing device 104(1) to cycle the power on the radio used to connect to the network access point 1108.

Commands 1114 that are passed on to the computing device 104(1) may be directed to one or more of the OS module 222, the communication module 224, the application 108, and so forth. Continuing the above example, the instructions to power cycle the radio may be directed to the operating system executing on the computing device 104(1).

In some implementations, the host device 1104 may be configured to perform one or more operations automatically in response to particular information in the output data 120. For example, where the output data 120 is indicative of a failure of the radio in the computing device 104 to connect to the network access point 1108, the host device 1104 may automatically remove the computing device 104 from service, issue commands to restart the radio in that computing device 104, and so forth. By using the output data 120, the host device 1104, the workstation 1110, or another device may monitor, control, or otherwise administer the computing devices 104(1) at another geolocation 1102.

In one implementation, the computing devices 104 at the geolocation 1102 may be used to perform remote testing of the application 108. For example, the developer 1112 may have the computing device 104(local) at the second geolocation 1102(2) executing the application 108, but wants to test performance of the application 108 as if at another location using a WCDN at that other location. The network data 110 associated with the computing device 104(local) at the second geolocation 1102(2) may be transferred via the network 106 to and from the host device 1104 that is located at the first geolocation 1102(1). The host device 1104 in turn transfers the network data 110 to a respective computing device 104(remote) that is used to communicate with the network access point 1108 of a particular WCDN at the first geolocation 1102(1). In this way, the developer 1112 at the second geolocation 1102(2) may test operation of the application 108 while using the telecommunication carrier's network at the first geolocation 1102(1). The SDK module 116 may execute on the computing device 104(remote) at the first geolocation 1102(1) to provide the output data 120.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:
   a communication interface to connect to a wireless cellular data network;
   one or more memories storing computer-executable instructions; and
   one or more hardware processors to:
     execute an application;
     acquire, at a first data collection rate, first metric data indicative of a value of a network characteristic;
     store the first metric data obtained at the first data collection rate in a buffer such that newest values are added to the buffer and older values are removed from the buffer;
     communicate with a second device using the communication interface;
     determine a change over time in at least a portion of the first metric data stored in the buffer exceeds a first threshold;
     acquire, at a second data collection rate greater than the first data collection rate, second metric data indicative of a value of the network characteristic;
     store the second metric data obtained at the second data collection rate in the buffer such that newest values are added to the buffer and older values are removed from the buffer;
     determine a set of bins, wherein each bin specifies an interval from a first value to a second value;
     for each one of the set of bins, generate a first set of frequencies comprising a frequency of the values in the buffer that are within the interval of the bin;
     based on the first set of frequencies, generate first output data associated with the communication with the second device;
     determine, based at least in part on the first output data, usage of the communication interface is below a threshold for a threshold period of time; and
     send the first output data using the communication interface.

2. The device of claim 1, wherein the network characteristic includes one or more of:
   bandwidth,
   latency,
   number of packets sent,
   packet loss,
   transmit power,
   received signal strength, or jitter; and wherein the first data collection rate is less than 20 samples per second and the second data collection rate is greater than 1000 samples per second.

3. The device of claim 1, the computer-executable instructions to generate the first output data further comprising computer-executable instructions to:

fit a normal curve to the first set of frequencies; and determine one or more of a maximum value, a median value, or a percentile value associated with the network characteristic.

4. The device of claim 1, the computer-executable instructions to generate the first output data further comprising computer-executable instructions to:

determine one or more percentile values of the first set of frequencies;

determine a change in the one or more percentile values from a first time to a second time;

determine the change exceeds a threshold change value; and generate data indicative of occurrence of an event.

5. The device of claim 1, the computer executable instructions further comprising computer-executable instructions to:

store the first output data in an output buffer having a predetermined storage capacity;

determine, based at least in part on the first output data, the communication interface is connected to the wireless cellular data network;

determine, based at least in part on the first output data, the communication interface is available for use;

determine the output buffer is full; and send at least a portion of the first output data using the communication interface.

6. The device of claim 1, wherein the generation of the first set of frequencies is responsive to a determination that a quantity of data transferred using the communication interface exceeds a threshold quantity.

7. A system comprising:

a communication interface;

one or more memories storing computer-executable instructions; and one or more hardware processors to:

acquire, at a first data collection rate, metric data associated with operation of the communication interface;

determine a plurality of intervals, each interval extending from a first endpoint to a second endpoint;

associate at least a portion of the metric data with the plurality of intervals;

determine, for at least a portion of the plurality of intervals, a frequency of the metric data associated with each of the intervals;

determine a percentile value from a plurality of frequencies of the at least a portion of the plurality of intervals;

determine a change in the percentile value from a first time to a second time;

determine the change exceeds a threshold change value; and generate output data.

8. The system of claim 7, wherein the first data collection rate comprises acquiring metric data at intervals of less than 1 millisecond; and the instructions to generate the output data further comprising computer-executable instructions to:

transition to a second data collection rate less than the first data collection rate.

9. The system of claim 7, the computer-executable instructions to generate the output data further comprising computer-executable instructions to:

access data indicative of one or more of a geographic location of the system, a type of system, an operating system associated with the system, or a network type; and wherein one or more of the first data collection rate or a size of the interval is based at least in part on the accessed data.

10. The system of claim 7, the computer-executable instructions to generate the output data further comprising computer-executable instructions to:

access predefined metric data; and wherein the instructions to determine the frequency of the metric data include the predefined metric data and the acquired metric data.

11. The system of claim 7, the computer-executable instructions to generate the output data further comprising computer-executable instructions to:

access predefined frequency startup values; and wherein the instructions to generate the output data are based on the predefined frequency startup values.

12. The system of claim 7, the computer-executable instructions further comprising computer-executable instructions to:

fit a curve to at least a portion of frequencies for the at least a portion of the plurality of intervals; and wherein the instructions to generate the output data further comprising computer-executable instructions to:

determine one or more parameters of the curve.

13. The system of claim 7, wherein operation of the communication interface comprises transfer of network data between a first application executing on the one or more hardware processors and an external device; and the instructions further comprising computer-executable instructions to:

add the output data to the network data.

14. The system of claim 7, the computer-executable instructions further comprising computer-executable instructions to:

based at least in part on the output data, determine the communication interface is transferring data;

based at least in part on the output data, determine utilization of the communication interface is below a threshold value; and send the output data using the communication interface.

15. A method comprising:

acquiring, at a first data collection rate, first metric data associated with operation of a device during a first time period;

distributing the first metric data into a plurality of intervals;

determining, for at least a portion of the plurality of intervals, a frequency of the metric data;

determining a percentile value from a plurality of frequencies of the at least a portion of the plurality of intervals;

determining a change in the percentile value from a first time to a second time;

determining the change exceeds a threshold change value; and generating output data based on the determined change.

16. The method of claim 15, wherein the device comprises a communication interface; and further comprising:

determining, based at least in part on the output data, the communication interface is transferring data using a network;

determining, based at least in part on the output data, utilization of the communication interface is below a threshold value; and sending at least a portion of the output data responsive to the determination the utilization of the communication interface is below the threshold value.

17. The method of claim 15, further comprising:

determining the output data is indicative of a change in the first metric data exceeding a threshold value;

discontinuing acquisition at the first data collection rate; and acquiring, at a second data collection rate greater than the first data collection rate, second metric data associated with the operation of the device during a second time period.

18. The method of claim 15, wherein the distributing the first metric data into the plurality of intervals is responsive to determining the first metric data exceeds a threshold value, wherein the first metric data is indicative of a quantity of data transferred.

19. The method of claim 15, further comprising:

accessing one or more predefined frequency startup values; and setting an initial value of the frequency for the at least a portion of the plurality of intervals based on the one or more predefined startup values.

20. The method of claim 15, further comprising:

transitioning to a second data collection rate that is greater than the first data collection rate, wherein the second data collection rate comprises acquiring metric data at intervals of less than 1 millisecond.

* * * * *